(12) United States Patent
Chen et al.

(10) Patent No.: US 10,038,942 B2
(45) Date of Patent: Jul. 31, 2018

(54) AUTOMATIC CONTROL OF VIDEO CONTENT PLAYBACK BASED ON PREDICTED USER ACTION

(71) Applicant: ECHOSTAR TECHNOLOGIES L.L.C., Englewood, CO (US)

(72) Inventors: Mi Chen, Auroroa, CO (US); Yunfeng Yang, Aurora, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 15/181,657

(22) Filed: Jun. 14, 2016

(65) Prior Publication Data
US 2017/0359626 A1 Dec. 14, 2017

(51) Int. Cl.
| | |
|---|---|
| H04H 60/33 | (2008.01) |
| H04N 21/6587 | (2011.01) |
| H04N 21/442 | (2011.01) |
| H04N 21/25 | (2011.01) |
| H04N 21/466 | (2011.01) |

(52) U.S. Cl.
CPC ....... *H04N 21/6587* (2013.01); *H04N 21/251* (2013.01); *H04N 21/44222* (2013.01); *H04N 21/4667* (2013.01)

(58) Field of Classification Search
CPC ......... H04N 21/44222; H04N 21/4542; H04N 21/812
See application file for complete search history.

(56) References Cited

U.S. PATENT DOCUMENTS

| | | | | |
|---|---|---|---|---|
| 2006/0218573 | A1* | 9/2006 | Proebstel | H04H 60/33 725/14 |
| 2007/0136751 | A1* | 6/2007 | Garbow | H04N 7/173 725/46 |
| 2010/0332329 | A1* | 12/2010 | Roberts | G06Q 30/0269 705/14.66 |
| 2015/0229975 | A1* | 8/2015 | Shaw | H04N 21/23439 725/10 |

\* cited by examiner

*Primary Examiner* — Gigi L Dubasky
(74) *Attorney, Agent, or Firm* — Lorenz & Kopf, LLP

(57) ABSTRACT

Various methods and systems for controlling the operation of a media playback device are presented here. An exemplary embodiment of a control method receives user interaction data that indicates content consumption behavior of at least one user of a media services delivery system. The user interaction data is processed to obtain playback prediction data for a particular subscriber of the media services delivery system. The method continues by determining that a particular video event is being presented by the media playback device to the particular subscriber, and by generating control commands in accordance with the playback prediction data. The control commands automatically modify playback characteristics of the particular video event during presentation to the particular subscriber.

16 Claims, 4 Drawing Sheets

AUTOMATIC CONTROL OF VIDEO CONTENT PLAYBACK BASED ON PREDICTED USER ACTION

TECHNICAL FIELD

Embodiments of the subject matter described herein relate generally to content distribution systems, such as video services systems. More particularly, embodiments of the subject matter relate to systems and methodologies for automatically controlling the playback characteristics of video content to a subscriber of a video services system.

BACKGROUND

Most television viewers now receive their video signals through a content aggregator such as a cable or satellite television provider. Digital video broadcasting (DVB) systems, such as satellite systems, are generally known. A DVB system that delivers video service to a home will usually include a video services receiver, system, or device, which is commonly known as a set-top box (STB). In the typical instance, encoded television signals are sent via a cable or wireless data link to the viewer's home, where the signals are ultimately decoded in the STB. The decoded signals can then be viewed on a television or other appropriate display as desired by the viewer.

In addition to receiving and demodulating video content (such as television programming), many video services receivers are able to provide additional features. Examples of popular features available in many modern video services receivers include electronic program guides (EPGs), digital video recorders (DVRs), "place-shifting" features for streaming received content over a network or other medium, and/or the ability to simultaneously view multiple programs showing on different channels using picture-in-picture (PIP) functionality.

A typical viewer of broadcast, recorded, or on-demand video may have certain viewing habits, traits, or preferences, especially when watching recorded video content that supports trick play modes (such as fast-forward, skip-ahead, or commercial bypass modes). For example, some users tend to fast-forward through or skip over all advertisements and commercials, while other users may be in the habit of watching all commercials related to video games. As another example, some users may choose to watch only scoring plays during recorded football games. Unfortunately, each individual end user is still expected to manually control the playback characteristics of recorded, buffered, and on-demand video programs during the presentation of such programs.

Accordingly, it is desirable to have an intelligent video delivery system that learns the viewing preference and habits of the end user for purposes of automatically controlling certain playback characteristics of video events. In addition, it is desirable to have a database system (which can be cloud-based) that intelligently collects, analyzes, and maintains user interaction data that indicates the content consumption behavior of users of the video delivery system. Furthermore, other desirable features and characteristics will become apparent from the subsequent detailed description and the appended claims, taken in conjunction with the accompanying drawings and the foregoing technical field and background.

BRIEF SUMMARY

A method of controlling operation of a media playback device is presented here. An exemplary embodiment of the method receives user interaction data that indicates content consumption behavior of at least one user of a media services delivery system. The user interaction data is processed to obtain playback prediction data for a particular subscriber of the media services delivery system. The method continues by determining that a particular video event is being presented by the media playback device to the particular subscriber, and by generating control commands in accordance with the playback prediction data. The control commands automatically modify playback characteristics of the particular video event during presentation to the particular subscriber.

A system for controlling operation of a media playback device is also presented here. An exemplary embodiment of the system includes: a processing architecture having at least one processor; and a non-transitory computer readable medium operatively associated with the processing architecture. The computer readable medium stores executable instructions configurable to cause the processing architecture to perform a method that involves: receiving user interaction data that indicates content consumption behavior of at least one user of a media services delivery system; processing the user interaction data to obtain playback prediction data for a particular subscriber of the media services delivery system; determining that a particular video event is being presented by the media playback device to the particular subscriber; and generating control commands in accordance with the playback prediction data. The control commands automatically modify playback characteristics of the particular video event during presentation to the particular subscriber.

Another method of controlling operation of a media playback device is also presented here. The method provides user interaction data that indicates content consumption behavior of a particular subscriber of a media services delivery system. The method obtains playback prediction data for the particular subscriber, wherein the playback prediction data is generated in response to at least the provided user interaction data. The media playback device is operated to present a particular video event to the particular subscriber, and the method automatically modifies playback characteristics of the particular video event during presentation to the particular subscriber, in response to the obtained playback prediction data.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
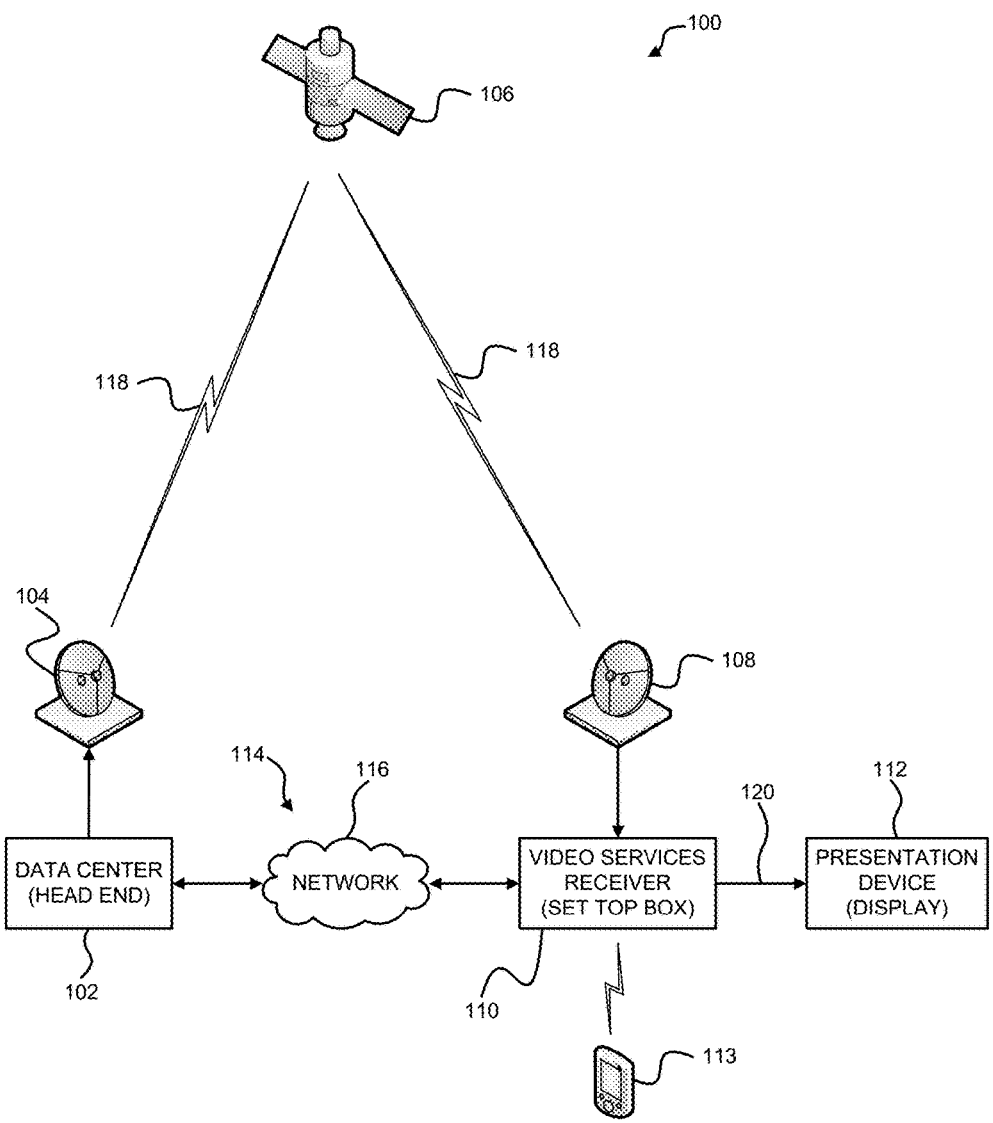
FIG. 1 is a schematic representation of an embodiment of a video services broadcasting system.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like. The software that performs the described functionality may reside and execute at a host device, such as a video services receiver, a mobile device, or a home entertainment component, or it may be distributed for execution across a plurality of physically distinct devices, systems, or components, as appropriate for the particular embodiment.

The following description relates to a video delivery system that is suitably configured to process audio/visual content for presentation to a user. Although the following description focuses on video content conveyed in a video stream, the subject matter may also be utilized to handle audio content conveyed in an audio stream, such as a broadcast radio program, a streaming music channel, or the like. The exemplary embodiments described below relate to a video delivery system such as a satellite television system. Accordingly, in some implementations, the system supports traditional linear content delivery technologies such as those utilized by cable and satellite broadcast services. Alternatively or additionally, non-linear content delivery technologies can be leveraged. Non-linear technologies include, without limitation, Internet Protocol Television (IPTV), Over-The-Top (OTT) content delivery, on-demand content, and the like.

The disclosed subject matter relates to the automatic control and operation of media playback devices that are used to present video content to users/subscribers of the system. The playback characteristics of video events can be automatically controlled in a way that reflects the user's viewing habits, historical use of trick play modes, demographic information, and the like. The system includes or cooperates with a server system having an intelligent prediction engine that learns each user's preferences, viewing habits, likes, dislikes, video playback command history, etc. The prediction engine considers user interaction data to determine how best to automatically control playback characteristics (e.g., trick play modes) of video programs in an ongoing manner. The prediction engine anticipates how the user is likely to control the playback of a given video event and generates appropriate commands to influence the presentation of the video event with little to no involvement of the user.

Turning now to the drawings, FIG. 1 is a schematic representation of an embodiment of a video services broadcasting system 100 that is suitably configured to support the techniques and methodologies described in more detail below. The system 100 (which has been simplified for purposes of illustration) generally includes, without limitation: a data center 102; an uplink transmit antenna 104; a satellite 106; a downlink receive antenna 108; a video services receiver 110 or other customer equipment; and a presentation device, such as a display element 112. In typical deployments, the video services receiver 110 can be remotely controlled using a wireless remote control device 113. In certain embodiments, the data center 102 communicates with the video services receiver 110 via a back-channel connection 114, which may be established through one or more data communication networks 116. For the sake of brevity, conventional techniques related to satellite communication systems, satellite broadcasting systems, DVB systems, data transmission, signaling, network control, and other functional aspects of the systems (and the individual operating components of the systems) may not be described in detail herein.

The data center 102 may be deployed as a headend facility and/or a satellite uplink facility for the system 100. The data center 102 generally functions to control content, signaling data, programming information, and other data sent over a high-bandwidth link 118 to any number of downlink receive components (only one downlink receive antenna 108, corresponding to one customer, is shown in FIG. 1). In practice, the data center 102 also provides content and data that can be used to populate an interactive electronic program guide (EPG) generated by the video services receiver 110. In the embodiment shown in FIG. 1, the high-bandwidth link 118 is a direct broadcast satellite (DBS) link that is relayed by the satellite 106, although equivalent embodiments could implement the high-bandwidth link 118 as any sort of cable, terrestrial wireless and/or other communication link as desired.

The data center 102 includes one or more conventional data processing systems or architectures that are capable of producing signals that are transmitted via the high-bandwidth link 118. In various embodiments, the data center 102 represents a satellite or other content distribution center having: a data control system for controlling content, signaling information, blackout information, programming information, and other data; and an uplink control system for transmitting content, signaling information, blackout information, programming information, and other data using the high-bandwidth link 118. These systems may be geographically, physically and/or logically arranged in any manner, with data control and uplink control being combined or separated as desired.

The uplink control system used by system 100 is any sort of data processing and/or control system that is able to direct the transmission of data on the high-bandwidth link 118 in any manner. In the exemplary embodiment illustrated in FIG. 1, the uplink transmit antenna 104 is able to transmit data to the satellite 106, which in turn uses any number of appropriately configured transponders for repeated transmission to the downlink receive antenna 108.

Under normal operating conditions, the satellite 106 transmits content, signaling data, blackout information, EPG data, and other data to the downlink receive antenna 108, using the high-bandwidth link 118. In practical embodiments, the downlink receive antenna 108 represents the customer's satellite dish, which is coupled to the video services receiver 110. The video services receiver 110 can be realized as any device, system or logic capable of receiving signals via the high-bandwidth link 118 and the downlink receive antenna 108, and capable of providing demodulated content to a customer via the display element 112.

The display element 112 may be, without limitation: a television set; a monitor; a computer display; or any suitable customer appliance with compatible display capabilities. In various embodiments, the video services receiver 110 is implemented as a set-top box (STB) as commonly used with DBS or cable television distribution systems. In other embodiments, however, the functionality of the video services receiver 110 may be commonly housed within the display element 112 itself. In still other embodiments, the video services receiver 110 is a portable device that may be transportable with or without the display element 112. The video services receiver 110 may also be suitably configured to support broadcast television reception, video game playing, personal video recording and/or other features as desired. Moreover, the system can support other media playback devices, which may receive video data from the network 116 and/or from a satellite feed. In practice, a media playback device can be, without limitation: a laptop, desktop, tablet, or portable computer; a smartphone device; a digital media player device; a video game console or portable device; a medical device; a navigation device; a smart toy device; a wearable computing device; or the like.

During typical operation, the video services receiver 110 receives programming (broadcast events), signaling information, and/or other data via the high-bandwidth link 118. The video services receiver 110 then demodulates, decompresses, descrambles, and/or otherwise processes the received digital data, and then converts the received data to suitably formatted video signals 120 that can be rendered for viewing by the customer on the display element 112. The video services receiver 110 may also be capable of receiving web-based content via the network 116, the Internet, etc., and may also be capable of recording and playing back video content.

The system 100 includes one or more speakers, transducers, or other sound generating elements or devices that are utilized for playback of sounds during operation of the system 100. These sounds may be, without limitation: the audio portion of a video channel or program; the content associated with an audio-only channel or program; audio related to the navigation of the graphical programming guide; confirmation tones generated during operation of the system; alerts or alarm tones; or the like. Depending upon the embodiment, the system 100 may include a speaker (or a plurality of speakers) attached to, incorporated into, or otherwise associated with the display device, the video services receiver 110, the remote control device 113, and/or a home theater, stereo, or other entertainment system provided separately from the system 100.

The video services receiver 110 can be operated in a traditional manner to receive, decode, and present video streams for presentation to a user (i.e., a recorded or current broadcast show that the user is currently watching). Moreover, the video services receiver 110 can be operated to identify, flag, or mark certain types video content or segments of video content that represent advertisements, commercials, topics of interest, events of interest (e.g., action scenes, scoring plays in a football game, violent scenes in a movie, etc.), genres, categories, or the like. In certain implementations, the video services receiver 110 includes multiple tuners to enable it to concurrently receive and process a first video stream along with one or more additional video streams if needed.

Although not separately depicted in FIG. 1, the video services receiver 110 may include video place-shifting functionality or it may cooperate with a suitably configured place-shifting device or component to place-shift video content that is received by the video services receiver 110. In this regard, it may be possible to provide live or recorded content to a remote device operated by the user, wherein the video services receiver 110 serves as a source of the place-shifted content.

The system 100 may include one or more database systems, server systems, data storage devices or systems, or memory architectures that are configured and arranged as needed to support the functionality described herein. For example, the data center 102 may be provided with a suitably configured database that may be accessed by the video services receiver 110. Alternatively, or additionally, the system 100 may include or cooperate with any number of databases that can be accessed via the network 116. In this regard, the video services receiver 110 may be operatively coupled with a distributed database architecture that is supported by the network 116. Alternatively, or additionally, the video services receiver 110 may include or be directly attached to a suitably configured storage element or device that provides a local database to support the various features and functionality described here. The embodiment described below assumes that the system 100 includes at least one cloud-based database that can be populated, maintained, and accessed as needed.

Figure 2:
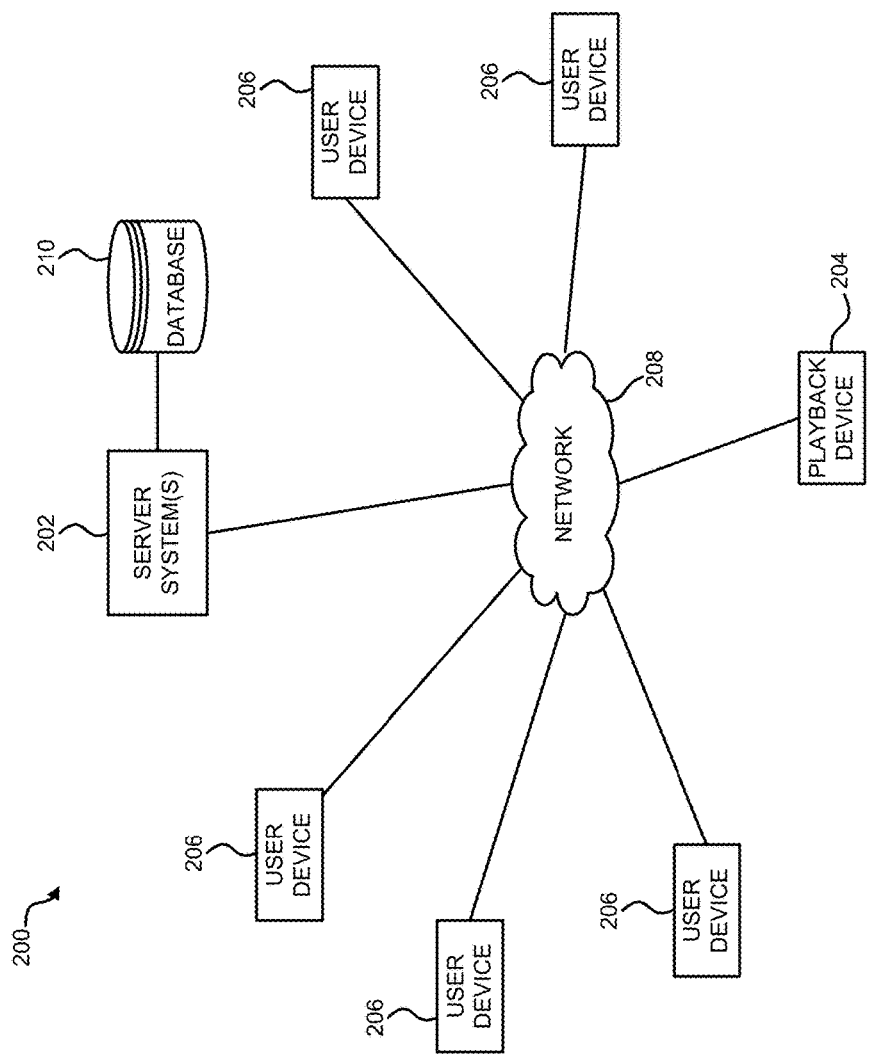
FIG. 2 is a block diagram that illustrates an exemplary embodiment of a system that automatically controls playback characteristics of video programs.

FIG. 2 is a block diagram that illustrates an exemplary embodiment of a system 200 that automatically controls playback characteristics of video programs. The system 200 is based around a cloud-based server system 202 that includes a prediction engine (not separately shown). The system 200 can collect user interaction data (which indicates content consumption behavior) and possibly other types of data associated with users of a media services delivery system. The server system 202 analyzes the collected data and information to generate control commands that automatically control playback characteristics of video content as it is being presented to a particular user for viewing at a media playback device 204. The exemplary embodiment of the system 200 supports data collection from a plurality of user devices 206, wherein data collected in association with other users can be analyzed to predict or recommend playback characteristics for the particular user. Thus, the prediction engine of the server system 202 can respond to user interaction data collected from only the viewing user, user interaction data collected from users other than the viewing user, or both.

The server system 202, each user device 206, and each playback device 204 can be implemented using a suitably configured computer-based or processor-based platform. For example, the server system 202 can be realized using one or more computer hardware components, each having a processing architecture with at least one processor, a non-transitory computer readable medium that is operatively associated with the processing architecture, input/output interfaces, networking components, and the like. Likewise, each user device 206 and each playback device 204 can be realized as a piece of hardware having one or more processor devices, a suitable amount of memory and storage space, a computer readable medium for storing software instructions, input/output features, network interfaces, display drivers, sound drivers, and the like.

The server system 202, the playback device 204, and the user devices 206 are communicatively coupled to a network 208, as mentioned above with reference to FIG. 1. Although FIG. 2 depicts only five user devices 206 and only one media playback device 204 for a viewing user, the system 200 can support any number of devices. Moreover, the server system 202 can be realized as a single piece of equipment or it can be implemented as a plurality of distinct physical systems that cooperate in a distributed manner.

The server system 202 is communicatively coupled to the network 208 in a manner that enables it to cooperate with the user devices 206 and the playback devices 204. The server system 202 includes or cooperates with a suitably configured database 210 that contains user interaction data collected by the server system 202. The database 210 can also be used to store other information that might be relevant for purposes of predicting content consumption behavior of users. In this regard, additional data can include, without limitation: user demographic information; age of the user; residence address, location, city, etc.; location of the playback device; the time, date, day of the week, month, etc. corresponding to user playback commands; favorite programming genres; gender, sexual orientation; political party affiliation or affinity; nationality; religion; native language; level of education; subscriber level or classification; favorite programs; favorite channels. Notably, the server system 202 can receive user interaction data that indicates content consumption behavior of the users (including the viewing user), along with additional relevant data, to predict or recommend playback characteristics, features, and/or commands for each user of interest. The predicted playback characteristics can be utilized during playback of a current video event to automatically control the playback in accordance with the predictions made for the particular user. Program-related metadata, flags or markers associated with the current video event, and/or other data that describes the content of the current video event can also be leveraged to enhance the accuracy of the prediction methodology. In this context, the server system 202 serves as a centralized platform for analyzing the viewing statistics and viewing patterns of the subscribers. In practice, the functionality and processing power of the server system 202 can be scaled as needed to support the desired number of users, user devices 206, and/or playback devices 204.

In certain embodiments, the server system 202 can generate output in the form of control commands that automatically modify the playback characteristics of the particular video event during presentation at the playback device 204. For example, the playback device 204 can process the control commands to initiate operations such as pausing, fast-forwarding, skipping, recording, or the like. In some embodiments, the functionality of the server system 202 and its database 210 resides at the individual playback devices 204. Thus, the playback prediction techniques and methodologies described herein can be implemented as native functionality of the playback devices 204. In other embodiments, the functionality of the server system 202 and its database 210 resides at video services receivers (see FIG. 1). In such embodiments, data collected for other users can be downloaded to the playback devices 204 and/or to the video services receivers as needed (e.g., once a day, during dormant periods, or weekly).

Figure 3:
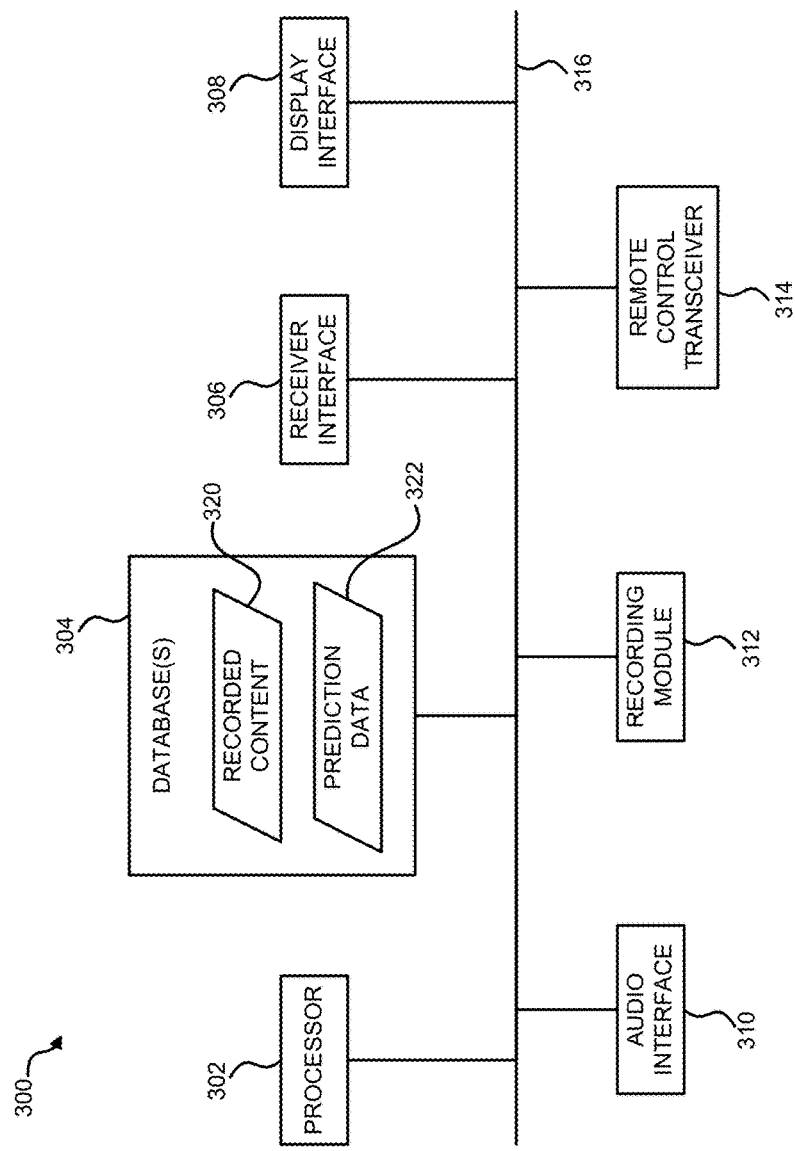
FIG. 3 is a schematic representation of an embodiment of a video services receiver suitable for use in the video services broadcasting system shown in FIG. 1.

FIG. 3 is a schematic representation of an embodiment of a video services receiver 300 suitable for use in the video services broadcasting system 100 shown in FIG. 1. This example assumes that the video services receiver 300 includes or is implemented as the viewer's media playback device 204 shown in FIG. 2. Thus, the video services receiver 300 can be utilized to send user interaction data to the server system 202, and it can receive information from the server system 202 as needed to support the automatic playback control features described herein. In practice, the video services receiver 300 is designed and configured for providing recorded, buffered, and non-recorded (i.e., "live") video content to a user, by way of one or more presentation devices. Accordingly, the video services receiver 300 can be used to receive program content, record program content, and present recorded and non-recorded program content to an appropriate display for viewing by a customer or user.

The illustrated embodiment of the video services receiver 300 generally includes, without limitation: at least one processor 302; at least one database 304, which may be realized using one or more memory elements having a suitable amount of data storage capacity associated therewith; a receiver interface 306; a display interface 308 for the display; an audio interface 310; a recording module 312; and a remote control transceiver 314. These components and elements may be coupled together as needed for purposes of interaction and communication using, for example, an appropriate interconnect arrangement or architecture 316. It should be appreciated that the video services receiver 300 represents an embodiment that supports various features described herein. In practice, an implementation of the video services receiver 300 need not support all of the enhanced features described here and, therefore, one or more of the elements depicted in FIG. 3 may be omitted from a practical embodiment. Moreover, a practical implementation of the video services receiver 300 will include additional elements and features that support conventional functions and operations.

The processor 302 may be implemented or performed with a general purpose processor, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor 302 may be realized as a microprocessor, a controller, a microcontroller, or a state machine. Moreover, the processor 302 may be implemented as a combination of computing devices, e.g., a combination of a digital signal processor and a microprocessor, a plurality of microprocessors, one or more microprocessors in conjunction with a digital signal processor core, or any other such configuration. A processor architecture and/or a processor device of this type may also be utilized in the various components depicted in FIG. 1 and FIG. 2.

The database 304 may be realized using any number of data storage devices, components, or modules, as appropriate to the embodiment. Moreover, the video services receiver 300 could include a database 304 integrated therein and/or a database 304 that is implemented in an external memory element that is operatively coupled to the video services receiver 300 (as appropriate to the particular embodiment). The database 304 can be coupled to the processor 302 such that the processor 302 can read information from, and write information to, the database 304. In practice, a memory element of the video services receiver 300 could be used to implement the database 304. In this regard, the database 304 could be realized using RAM memory, flash memory, EPROM memory, EEPROM memory, registers, a hard disk, a removable disk, or any other form of storage medium known in the art. In certain embodiments, the video services receiver 300 includes a hard disk, which may also be used to support integrated DVR functions of the video services receiver 300, and which may also be used to implement the database 304. A database 304 or database system of this type may also be utilized for the database 210 shown in FIG. 2.

As schematically depicted in FIG. 3, the database 304 can be used to store recorded content 320 (which may include recorded program content, downloaded video content, buffered live or on-demand content, or the like) under the control and management of the recording module 312. The database 304 may also be used to populate and maintain prediction data 322 associated with a user of the video services receiver 300, associated with stored video content, or the like. The prediction data 322 (or a portion thereof) could be resident at a remote device or storage element, such as the database 210 shown in FIG. 2, that can be accessed by the video services receiver 300. In certain embodiments, the database 304 can be populated with prediction data 322 received from at least one other video services receiver (not shown) operated by the particular video services provider. Similarly, the video services receiver 300 could be suitably configured such that other video services receivers have access to the database 304 for purposes of sharing the prediction data 322. A cooperative arrangement of video services receivers may be desirable to take advantage of the viewing habits of a large number of customers and to more efficiently populate the database 304 with new information as needed.

The receiver interface 306 is coupled to the customer's satellite antenna, and the receiver interface 306 is suitably configured to receive and perform front end processing on signals transmitted by satellite transponders. In this regard, the receiver interface 306 can receive data associated with any number of services (e.g., video services), on-screen menus, GUIs, interactive programming interfaces, etc. The receiver interface 306 may leverage conventional design concepts that need not be described in detail here. For example, the receiver interface 306 may be associated with a plurality of different tuners (not shown) that enable the video services receiver 300 to process video streams in the background while decoding and presenting another video stream.

The display interface 308 is operatively coupled to one or more display elements (not shown) at the customer site. The display interface 308 represents the hardware, software, firmware, and processing logic that is utilized to render graphics, images, video, and other visual indicia on the customer's display. In this regard, the display interface 308 facilitates the presentation of programs on the display(s) at the customer premises. For example, the display interface 308 is capable of providing graphical interactive programming interfaces for video services, interactive listings of recorded programs, interactive graphical menus, and other GUIs for display to the user. The display interface 308 may leverage conventional design concepts that need not be described in detail here.

The audio interface 310 is coupled to one or more audio system components (not shown) at the customer site. The audio interface 310 represents the hardware, software, firmware, and processing logic that is utilized to generate and provide audio signals associated with the operation of the video services receiver 300. Depending upon the particular embodiment, the audio interface 310 may be tangibly or wirelessly connected to the audio portion of a television or monitor device, or it may be tangibly or wirelessly connected to a sound system component that cooperates with the television or monitor device.

The recording module 312 is operatively coupled to the receiver interface 306 to record program events provided by the incoming services. In practice, the recording module 312 may include, cooperate with, or be realized as hardware, software, and/or firmware that is designed to provide traditional recording and/or buffering features and functions for the video services receiver 300. Accordingly, the recording module 312 may record video programs provided by video services, audio-only programs provided by audio services, or the like. The recording module 312 may also be utilized to record or store replacement video or image content, which can be processed and rendered as needed. As mentioned above, the recording module 312 cooperates with the database 304 to store the recorded content 320 as needed.

The remote control transceiver 314 performs wireless communication with one or more compatible remote devices, such as a remote control device, a portable computer, an appropriately equipped mobile telephone, or the like. The remote control transceiver 314 enables the user to remotely control various functions of the video services receiver 300, in accordance with well-known techniques and technologies. In certain embodiments, the remote control transceiver 314 is also used to wirelessly receive requests that are related to the generation, display, control, and/or operation of recorded program listings. For example, the remote control device 113 (see FIG. 1) could be used to initiate a playback command to request playback of a recorded program.

The techniques and methodologies presented here involve the collection and analysis of video content playback habits, trends, patterns, and preferences for purposes of predicting how a viewer might control certain playback characteristics of a video event she is watching. Playback of the video event can be automatically controlled (without any user involvement) in a way that is dictated or influenced by the predictions. With modern advances in computing hardware, big data collection and related analytics, and intelligent algorithms, the system can accurately track and analyze the playback habits of the users, e.g., when users activate fast-forwarding, when users skip over commercials, when users activate the skip-ahead feature, and for what type of content or for what specific program events. Similarly, the system can analyze user viewing data (which can be collected from set top boxes, from mobile apps, etc.) to determine other playback habits of the users.

As one simple and straightforward example, the system can detect that a particular user always skips or fast-forwards through commercials when viewing prime time programming. Accordingly, the system can automatically control playback of similar programming to skip commercials without requiring any user action. As another example, the system can determine that most male viewers who are between 20 and 30 years old tend to watch complete football and baseball games, while other viewers prefer to watch only touchdown or scoring plays. Thus, the system can automatically control playback characteristics of ongoing football programming based on the type of viewer. Another example assumes that a particular viewer usually skips the first 30 seconds of movies. The system can detect this viewing pattern and automatically begin playback of movie events at the 30 second mark rather than at the usual starting point.

The prediction-based control of video playback is particularly applicable to recorded, buffered, or on-demand video content, wherein certain trick play modes are available. In the context of live broadcast programming, however, the techniques and technologies presented here could still be leveraged to automatically initiate features such as channel switching, recording, insertion of targeted advertising, or the like (assuming that trick play modes such as fast-forwarding or skipping ahead are not available).

This description assumes that the video content of interest can be or is already cataloged or characterized, flagged, marked, or otherwise described or defined by associated metadata that enables the system to accurately control playback for the end users. The content-characterizing data can be embedded or otherwise included with the video data that conveys the program content and/or the content-characterizing data can be provided as distinct and separate data, relative to the video data. The content-characterizing data can be generated and provided by the creator or publisher of the video content, by the video service provider, by a broadcast network, or the like. In certain embodiments, creation of some or all of the content-characterizing data involves a human monitor or reviewer, wherein a person manually marks, flags, or identifies content while viewing a video event (live or recorded) to generate the associated content-characterizing data. In other embodiments, some or all of the content-characterizing data can be automatically generated using computer-implemented techniques such as: machine learning; artificial intelligence; smart algorithms; data analytics; audio analysis; video content analysis; video segment boundary detection; closed caption data analysis; and the like. Characterizing the video content and generating the associated content-characterizing data is typically performed as a background task for recorded video content. That said, the characterizing can also be performed for live broadcasts or live streaming in substantially real time.

In practice, commercial segment boundaries, program content segment boundaries, and/or the program content itself can be marked or flagged as needed to enable the playback devices to fast forward, skip ahead, or take other actions based on the identified boundaries or content. For example, the presentation time stamps of a movie event can be recorded to identify the occurrence of any of the following, without limitation: the beginning of the event; the end of the event; commercial breaks, if any; violent scenes; sex scenes; scenes in which a designated actor appears; action packed scenes; scenes with no dialogue; scenes having music as part of the soundtrack; outdoor scenes; indoor scenes; loud passages; quiet passages; a designated player's actions in a sporting event; etc. As another example, a baseball event can be pre-analyzed to identify the occurrence of any of the following, without limitation: the beginning of each inning; home runs; strikeouts; pitching changes; double plays; scoring plays; commercial breaks, if any; scenes that involve the network broadcast team; scenes that do not show actual game activity; etc. As yet another example, a music concert event can be characterized with metadata that indicates any of the following, without limitation: the beginning of the concert; the beginning of an encore, if any; the beginning of each song; dance numbers; guitar solos; crowd scenes; scenes that involve the artists interacting with the crowd between songs; drum solos; etc.

Correct, accurate, and extensive characterization of the video content is important to enable the playback device to automatically modify the default playback characteristics in accordance with the predicted viewing preferences of the end users. For example, if the system predicts that the viewer only likes to watch the last five minutes of each quarter of a basketball game, then the video data for a basketball game of interest must be marked or flagged in an appropriate manner to identify the ending of each quarter and/or to identify the five minute mark of each quarter. As another example, if the system predicts that the viewer dislikes scenes that depict excessive violence, then such scenes must be identified in the video event of interest to enable the playback device to automatically fast-forward or otherwise bypass those scenes.

The characterizing data can be provided in various ways. In this regard, some video events can include metadata, bookmark data, and/or flags provided by the broadcast source, the network, or the producers. In certain embodiments, a cloud-based analysis engine can review video programming to generate characterizing metadata, which in turn can be downloaded to video services receivers, user devices, playback devices, and the like. In accordance with some embodiments, recorded video content can be analyzed by the device or system that maintains the stored video data. For example, a video services receiver, a DVR component, a smartphone device, or any of the user devices or playback devices can be suitably configured to analyze and characterize recorded video content as needed to support the prediction-based control schemes described herein. The characterization of video content can be performed in an ongoing manner, and in the background at any time.

As explained above, the system described herein can react to historical viewing habits, trends, and patterns of the particular viewer, which is desirable for accurate and personalized playback control of video content that is presented to that viewer. In certain embodiments, however, the system can also consider viewing habits, playback trends, and patterns of other viewers, e.g., other users having something in common with the particular viewer. Accordingly, the prediction engine can collect and analyze user interaction data that indicates the content consumption behavior of the viewing user and/or any number of other users. Moreover, the prediction engine can collect and analyze user profile information that relates to the viewing user and/or any number of other users. Thus, if the prediction engine determines that the viewing user shares certain traits or characteristics with other users, then it can make recommendations based on the viewing habits and patterns of the other users whether or not user interaction data for the viewing user is also available.

The server system 202 (see FIG. 2) includes suitably configured processing logic and intelligence that enables it to receive and analyze information that may be indicative of the user's viewing habits, viewing preferences, playback commands, dislikes, preferred programming, favorite video events, and the like. To this end, the server system 202 can communicate with video services receivers, user devices, playback devices, and the like for purposes of obtaining user interaction data associated with the operation of video presentation devices and systems. The server system 202 also communicates or otherwise interacts with the playback device 204 to automatically control and configure the playback device 204 as needed to modify the playback characteristics of video events as needed. As shown in FIG. 2, the server system 202 can utilize the network 208 to obtain user interaction data related to the operation of the playback device 204. Moreover, communication with the network 208 allows the server system 202 to obtain and process user interaction data from any number of devices, systems, or sources if so desired.

Figure 4:
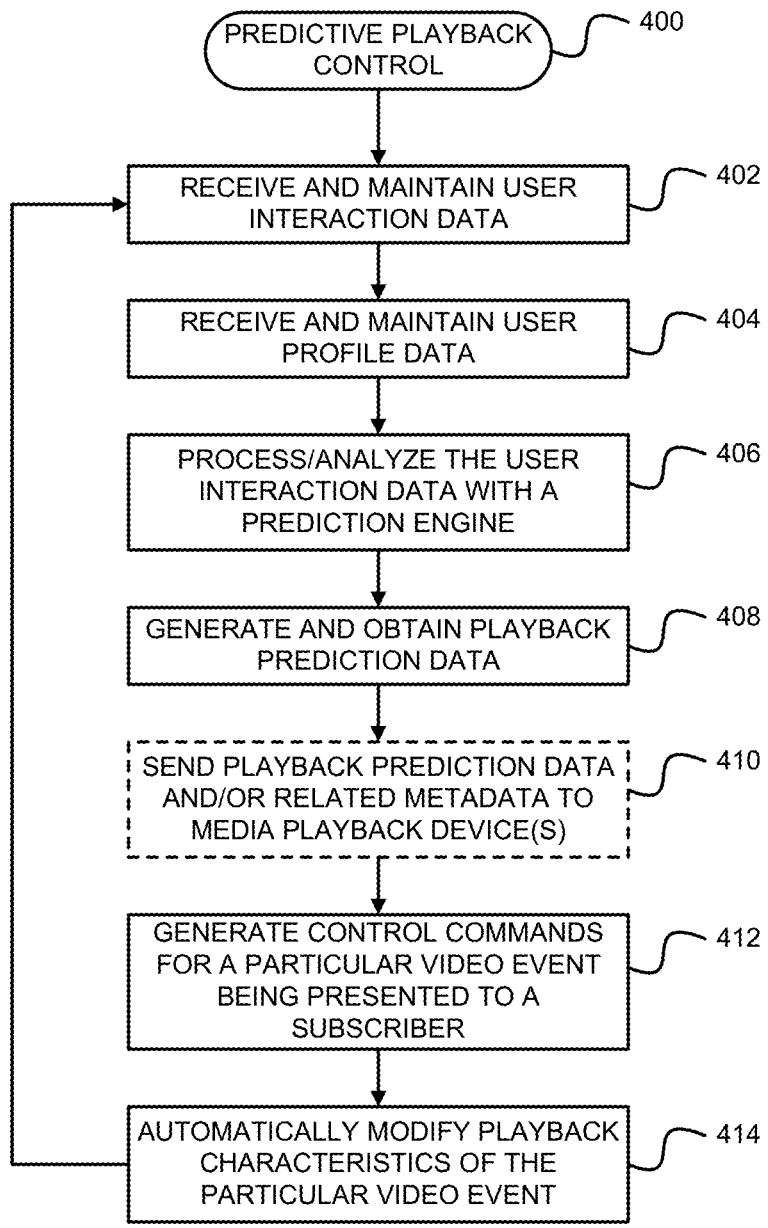
FIG. 4 is a flow chart that illustrates an exemplary embodiment of a predictive playback control process.

FIG. 4 is a flow chart that illustrates an exemplary embodiment of a predictive playback control process 400 that can be executed to automatically control the operation of a media playback device of a viewing user. The various tasks performed in connection with the process 400 may be performed by software, hardware, firmware, or any combination thereof. For illustrative purposes, the following description of the process 400 may refer to elements mentioned above in connection with FIGS. 1-3. In practice, portions of the process 400 may be performed by different elements of the described system, e.g., a centralized cloud-based server system, a set-top box, or a media playback device. It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

The process 400 receives and maintains user interaction data that indicates content consumption behavior of at least one user of the media services delivery system (task 402). The user interaction data can be received at a cloud-based server component, at a prediction engine or processing module that resides at a server component, at a user device, at the playback device, or at any suitably configured device, subsystem, component, or processing module of the system. The user interaction data can be provided by: one or more video services receivers deployed in the system; at least one user device; at least one media playback device; a cloud-based server system or monitoring service; or the like. For the exemplary embodiment described here in the context of the process 400, the user interaction data is obtained and collected by the prediction engine of the server system 202 (depicted in FIG. 2), which communicates with one or more sources of the user interaction data via wireless and/or wired data communication network technologies. Thus, at least some of the user interaction data is received by a server system that is remotely located relative to the media playback device. In some embodiments, user interaction data can be received and processed by a video services receiver (e.g., a set-top box in the user premises). In some embodiments, user interaction data can be obtained at mobile devices or other client devices that are owned or operated by the users (e.g., a smartphone, a media player device, a video game device, a tablet or laptop computing device, or a vehicle-based entertainment system).

The user interaction data corresponds to, or is otherwise associated with, certain content consumption behavior, viewing statistics, and/or viewing habits of: only a particular user, i.e., the viewing user of the media playback device; the particular user and at least one additional subscriber of the media services delivery system; a specified group of users that does not include the particular user; a user's household or workplace; a geographic region or territory in which the user is located; a demographic classification or category of which the user is a member; or the like. In this regard, the user interaction data is indicative or predictive of media playback habits, patterns, trends, likes, dislikes, and/or tendencies of the viewing user. To this end, the user interaction data may originate at one source or a variety of different sources. For example, a simple implementation of the process 400 can rely on user interaction data that is collected or provided by a content receiver device (such as a set-top box) that is operated by the viewing user, wherein the collected user interaction data includes usage data related to the operation of the content receiver device. For such an implementation, the user interaction data may include, without limitation: an identifier of the viewing user, the viewing user's household, or the viewing user's family; favorite channels configured by the user; historical playback commands corresponding to previously viewed instances of the video event of interest; statistics related to which channels are frequently/infrequently watched; history of on-demand programs purchased or viewed; statistics related to which programs (e.g., video events) are frequently/infrequently watched; the history of programs that have been recorded; statistics related to the activation of certain trick play modes, such as fast forward, skip ahead, commercial skipping, pausing, etc.; statistics related to channel hopping or frequency of channel switching during a video event; statistics related to the type, genre, category, or classification of most-watched video programming; statistics related to when, where, and how often video events are watched; periods of time corresponding to uninterrupted viewing; periods of time during which closed captioning is turned on; periods of time during which closed captioning is turned off; periods of time and/or amount of time during which audio is muted; and audio volume levels. As another example, a more complex version of the process 400 can consider user interaction data that originates from a plurality of different sources, and in the context of a plurality of different users.

As mentioned previously, the user interaction data received and handled by the process 400 need not be exclusive to any one individual user. In this regard, the process 400 can monitor, receive, and maintain user interaction data for a plurality of different users to predict media playback preferences for any viewing user and for any video event being watched by the viewing user. Thus, the process 400 can generate playback prediction data for an individual user based on the viewing habits and interaction of any number of other users. For example, the process 400 can generate citywide playback predictions, predictions that generally apply to a neighborhood or zip code, recommendations for an area code, playback predictions for a family or extended family, a designated group of individuals, or the like. Such a methodology enables the process 400 to generate media playback predictions for newer users or for newer video events (wherein the system has little to no historical user interaction data specifically corresponding to the new users and the new video events).

In accordance with certain embodiments, the process 400 also receives and maintains user profile data for at least one user of the media services delivery system (task 404). The user profile data can be received at a cloud-based server system, at a prediction engine or processing module that resides at a server system, at a user device, at the playback device, or at any suitably configured system, device, subsystem, component, or processing module of the system. The user profile data can be provided by: one or more video services receivers deployed in the system; at least one user device; at least one media playback device; a cloud-based server system or monitoring service; or the like. For the exemplary embodiment described here in the context of the process 400, the user profile data is obtained and collected by the prediction engine of the server system 202 (depicted in FIG. 2).

The user profile data corresponds to, or is otherwise associated with, any type of user-specific information, wherein each user of the system can have corresponding user profile data that is maintained for consideration by the prediction engine. In practice, the user profile data for a given user can include any or all of the following, without limitation: the geographic location of the media playback device(s); the current geographic location of the viewing user; demographic information; age of the user; an account number; a telephone number; favorite programming genres; gender, sexual orientation; political party affiliation or affinity; nationality; religion; native language; level of education; subscriber level or classification; favorite programs; favorite channels; hobbies; clubs or organizations; favorite bands or types of music; and favorite sports teams. The user profile data can supplement the collected user interaction data to better predict how any given user will control the playback characteristics of a video event. For example, the system might assume that the viewing user will prefer to control playback of a particular video event in a way that is consistent with other users having similar user profiles, whether or not there is also user interaction data available for the viewing user.

The process 400 continues by processing and analyzing at least a portion of the user interaction data and/or at least a portion of the user profile data in accordance with an appropriate prediction algorithm (task 406). As explained above, task 406 can be performed at a server system, a user device, a media playback device, a set-top box, or the like. In certain embodiments, task 406 is performed by the prediction engine of the server system 202. Task 406 may involve processing logic or intelligence that learns or predicts user preferences, habits, and playback control patterns based on the analyzed user interaction data, user profile data, and other information that might be available. For example, task 406 can also consider any or all of the following, without limitation: global positioning system (GPS) data that identifies the real-time location of a GPS-enabled device in the possession of the viewing user; the current time of day, day of the week, month, season, or the like; and whether the viewing user is watching the video event alone or with other people.

Depending on the particular implementation, the process 400 can employ any suitably configured learning algorithm, expert system, artificial intelligence methodology, and/or prediction technique to generate and obtain playback prediction data for the particular subscriber of the media services delivery system, i.e., the viewing user (task 408). The playback prediction data is generated in response to, and is determined by, at least some of the collected user interaction data and at least some of the collected user profile data. Some of the playback prediction data for the viewing user can be specific to certain video events. For example, if the server system is aware of a recorded program list for the viewing user, then program-specific playback prediction data can be applied to automatically control playback characteristics of the recorded programs. Alternatively or additionally, some of the playback prediction data can have "generic" applicability across different video events, genres, categories, or subsets of video events, whether or not such video events are actually recorded by the viewing user.

In accordance with certain embodiments, the process 400 generates the playback prediction data in the following manner. The prediction data may include conditions and related actions. A condition can be associated with: an event transition; an identifiable play or occurrence in a sporting event, such as a touchdown; or the like. The presentation time stamps of a movie event can be recorded to identify the occurrence of any of the following, without limitation: the beginning of the event; the end of the event; commercial breaks, if any; violent scenes; sex scenes; scenes in which a designated actor appears; action packed scenes; scenes with no dialogue; scenes having music as part of the soundtrack; outdoor scenes; indoor scenes; loud passages; quiet passages; a designated player's actions for a sports event; etc. The corresponding action can be, for example: fast forward to play; skip ahead until a specified point or time; switch content; switch sequence; play to end; fast forward to slow motion; backward to play; etc. In practice, the same file location can be associated with multiple conditions. For example, a particular location of a video program can be associated with an event transition condition and a scene change condition. In certain embodiments, the relationship between conditions and actions represents a many-to-many mapping. For example, event transitions and scene changes can have the action "fast forward to play" or the action "backward to play". As another example, the actions of "switch content" and "fast forward to play" can be associated with the same event transition.

The playback prediction data can include, be associated with, or be correlated to playback control commands that can be automatically executed by media playback devices. For example, the playback prediction data can be utilized to automatically control any of the following operating modes, without limitation: pause; stop; record; fast forward; skip ahead; buffer; channel change; skip commercial; advance to next segment boundary; and replace video segment with alternative content. It should be appreciated that task 408 can be performed in advance, i.e., before the video event of interest is being presented to the viewing user. In certain embodiments, however, task 408 can be performed on demand in response to a request from the media playback device, a set-top box, or other piece of equipment.

In certain embodiments where the playback prediction data is generated by a remote device or system (such as the server system 202), the process 400 can send the playback prediction data and/or related metadata to the media playback device (or devices) that is presenting the video event of interest (optional task 410). In this regard, the viewing user's media playback device can obtain and process the prediction data or metadata that is relevant to the video event. The process 400 continues by generating and communicating appropriate control commands for the particular video event that is being presented to the viewing user (task 412). Control commands can be included with the playback prediction data, or they can be selected or executed in response to the playback prediction data, depending on the particular implementation.

This description assumes that the system has already identified the video event that is being presented by the media playback device and, therefore, that the most relevant predicted control commands are issued. Task 412 can be performed by a remotely located device, system, or component (such as the server system 202), or it can be locally performed by a set-top box or by the media playback device. The control commands, when executed, automatically modify certain playback characteristics of the video event during presentation to the viewing subscriber/user (task 414). For example, if the particular video event of interest is a recorded, buffered, or on-demand event, then the control commands can automatically control or trigger various trick play features to alter the presentation of the particular video event. As mentioned above, the process 400 can automatically control any of the following operating modes, without limitation: pause; stop; record; fast forward; skip ahead; buffer; channel change; skip commercial; advance to next segment boundary; and replace video segment with alternative content.

Notably, task 414 can be performed in a seamless manner with little to no user involvement; this results in automated playback of the video event in a manner that is consistent with the predicted preferences of the viewing user. In alternative embodiments, the video services receiver or the user's playback device can be controlled to generate notifications to the user, wherein the notifications indicate that automated playback control is available. The notification can be an active element that allows the user to choose from various options, such as: accept the automatic control scheme; decline the automatic control scheme; individually approve each instance of automated control; disable the predicted playback scheme; or the like.

In certain embodiments, user feedback can be processed to supplement and modify the prediction engine. Thus, the process 400 can receive user feedback that is related to the predicted playback results. The user feedback can be generated by devoted buttons on a remote control, or via a graphical user interface presented to the user. The user feedback can include any amount of information as appropriate to the particular embodiment. For example, the user feedback may indicate whether or not the user agrees with the manner in which the video event has been altered, whether or not the user has overridden the delivered control commands, and to what extent. Regardless of the type or format of the user feedback, the prediction engine processes the received user feedback to update the predictions for that particular user. Over time, the user feedback can enhance the quality and accuracy of the predicted playback options and improve the user experience.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of controlling operation of a media playback device, the method comprising:
    receiving, by a prediction engine, user interaction data that indicates content consumption behavior of at least one user of a media services delivery system wherein the user interaction data is not specific to a particular user;
    receiving, by the prediction engine, user profile data that indicates content consumption behavior of the particular user of a media services deliver system wherein the user profile data is, in contrast, specific to the particular user and which additionally supplements the user interaction data which has been received;
    processing both the user interaction data and user profile data to obtain playback prediction data for a particular subscriber of the media services delivery system wherein the prediction playback data for the particular subscriber is specific to a particular video event wherein the particular video event comprises a recorded program from a recorded program list which enables the media services delivery system, by identifying to the media services delivery system which program-specific playback prediction data can be used, to automatically control playback characteristics of the recorded program and to determine playback prediction data which is generic and applicable to different video events for the particular subscriber wherein the different video events are not associated with the particular video event and have not been recorded by the subscriber wherein the playback prediction data further comprises: condition data and control command data of one or more conditions related to the particular video events which are in turn mapped to control command actions for the particular video event;
    determining that the particular video event is being presented by the media playback device to the particular subscriber; and
    generating control commands in accordance with the playback prediction data either specific to a particular video event, or generic and applicable to different video events, wherein the control commands automatically modify playback characteristics of the particular video event during presentation to the particular subscriber in accordance with both the user interaction data and the user profile data.

2. The method of claim 1, wherein the receiving is performed by a prediction engine of a server system that is remotely located relative to the media playback device.

3. The method of claim 2, wherein the processing and the determining are performed by the prediction engine of the server system.

4. The method of claim 1, wherein the receiving step is performed by a prediction engine of the media playback device.

5. The method of claim 4, wherein the processing and the determining are performed by the prediction engine of the media playback device.

6. The method of claim 1, wherein the user interaction data indicates content consumption behavior of only the particular subscriber.

7. The method of claim 1, wherein the user interaction data indicates content consumption behavior of the particular subscriber and at least one additional subscriber of the media services delivery system.

8. The method of claim 1, wherein:
    the particular video event is a recorded, buffered, or on-demand event; and
    the control commands automatically control trick play features of the particular video event.

9. The method of claim 1, wherein the processing step processes the user interaction data and user profile information of at least one user of the media services delivery system to obtain the playback prediction data either specific to a particular video event, or generic and applicable to different video events for the particular subscriber.

10. The method of claim 1, wherein the receiving step receives historical playback commands corresponding to previously viewed instances of the particular video event.

11. A system for controlling operation of a media playback device, the system comprising:
    a processing architecture having at least one processor; and a non-transitory computer readable medium operatively associated with the processing architecture, the computer readable medium comprising executable instructions configurable to cause the processing architecture to perform a method comprising:

receiving, by a prediction engine, user interaction data that indicates content consumption behavior of at least one user of a media services delivery system wherein the user interaction data is not specific to a particular user;

receiving, by the prediction engine, user profile data that indicates content consumption behavior of the particular user of a media services deliver system wherein the user profile data is, in contrast, specific to the particular user and which additionally supplements the user interaction data which has been received;

processing both the user interaction data and user profile data to obtain playback prediction data for a particular subscriber of the media services delivery system wherein the prediction playback data for the particular subscriber is specific to a particular video event wherein the particular video event comprises a recorded program from a recorded program list which enables the media services delivery system, by identifying to the media services delivery system which program-specific playback prediction data can be used, to automatically control playback characteristics of the recorded program and, alternately, to determine playback prediction data which is generic and applicable to different video events for the particular subscriber wherein the different video events are not associated with the particular video event and have not been recorded by the subscriber wherein the playback prediction data further comprises: condition data and control command data of one or more conditions related to the particular video events which are in turn mapped to control command actions for the particular video event;

determining that the particular video event is being presented by the media playback device to the particular subscriber; and generating control commands in accordance with the playback prediction data either specific to a particular video event, or generic and applicable to different video events, wherein the control commands automatically modify playback characteristics of the particular video event during presentation to the particular subscriber in accordance with both the user interaction data and the user profile data wherein the particular video event is a recorded, buffered, or on-demand event; and the control commands automatically control trick play features of the particular video event.

12. The system of claim 11, wherein the user interaction data indicates content consumption behavior of only the particular subscriber.

13. The system of claim 11, wherein the user interaction data indicates content consumption behavior of the particular subscriber and at least one additional subscriber of the media services delivery system.

14. The system of claim 11, wherein the processing step processes the user interaction data and user profile information of at least one user of the media services delivery system to obtain the playback prediction data either specific to a particular video event, or generic and applicable to different video events for the particular subscriber.

15. The system of claim 11, wherein the receiving step receives historical playback commands corresponding to previously viewed instances of the particular video event.

16. A method of controlling operation of a media playback device, the method comprising:

providing, by configuring a prediction engine, user interaction data that indicates content consumption behavior of a particular subscriber of a media services delivery system wherein the user interaction data is not specific to a particular user;

receiving, by further configuring the prediction engine, user profile data that indicates content consumption behavior of the particular user of a media services deliver system wherein the user profile data is, in contrast, specific to the particular user and which additionally supplements the user interaction data which has been received;

obtaining playback prediction data for the particular subscriber, wherein the playback prediction data is generated in accordance to at least the provided user interaction data and the received user profile data and is specific to certain video events wherein the particular video events comprise recorded programs from a recorded program list which enable the media services delivery system, by informing the media services delivery system which program-specific playback prediction data can be used, to automatically control playback characteristics of the recorded programs and to determine playback prediction data which is generic and applicable to different video events for the particular subscriber wherein the different video events are not associated with the particular video events and have not been recorded by the subscriber wherein the playback prediction data further comprises: condition data and control command data of one or more conditions related to the particular video events which are in turn mapped to control command actions for the particular video event;

operating the media playback device to present the particular video event to the particular subscriber;

automatically modifying the playback characteristics of the particular video event during presentation to the particular subscriber, in accordance to the obtained playback prediction data wherein the playback prediction data is generated in response to additional user interaction data that indicates content consumption behavior of at least one additional subscriber of the media services delivery system wherein the particular video event is a recorded, buffered, or on-demand event; and generating control commands in accordance with the playback prediction data either specific to a particular video event, or generic and applicable to different video events, which automatically control trick play features of the particular video event wherein the providing step provides historical playback commands corresponding to previously viewed instances of the particular video event.

* * * * *